United States Patent
Kang

(10) Patent No.: US 7,470,353 B2
(45) Date of Patent: Dec. 30, 2008

(54) METHOD OF MANUFACTURING FIELD EMITTER ELECTRODE USING SELF-ASSEMBLING CARBON NANOTUBES AND FIELD EMITTER ELECTRODE MANUFACTURED THEREBY

(75) Inventor: Hyoung Dong Kang, Suwon (KR)

(73) Assignee: Samsung Electro-Mechanics Co., Ltd. (KR)

( * ) Notice: Subject to any disclaimer, the term of this patent is extended or adjusted under 35 U.S.C. 154(b) by 609 days.

(21) Appl. No.: 11/093,125

(22) Filed: Mar. 29, 2005

(65) Prior Publication Data

US 2006/0046602 A1 Mar. 2, 2006

(30) Foreign Application Priority Data

Aug. 30, 2004 (KR) ...................... 10-2004-0068617
Nov. 23, 2004 (KR) ...................... 10-2004-0096538

(51) Int. Cl.
*C25D 13/02* (2006.01)
*H01J 9/02* (2006.01)

(52) U.S. Cl. .................... 204/487; 204/491; 445/51

(58) Field of Classification Search ................ 204/487, 204/491; 445/51
See application file for complete search history.

(56) References Cited

U.S. PATENT DOCUMENTS

| | | | |
|---|---|---|---|
| 5,830,326 A * | 11/1998 | Iijima | ........................ 204/173 |
| 6,097,138 A | 8/2000 | Nakamoto | |
| 6,129,901 A | 10/2000 | Moskovits et al. | |
| 6,630,772 B1 * | 10/2003 | Bower et al. | ................ 313/311 |
| 6,794,666 B2 | 9/2004 | Choi et al. | |
| 6,914,381 B2 | 7/2005 | Okai et al. | |
| 7,252,749 B2 * | 8/2007 | Zhou et al. | ................... 204/484 |
| 2004/0195950 A1 | 10/2004 | Ryu et al. | |
| 2005/0276743 A1 * | 12/2005 | Lacombe et al. | ......... 423/447.3 |

FOREIGN PATENT DOCUMENTS

| | | | |
|---|---|---|---|
| JP | 06228824 A | | 8/1994 |
| JP | 10149760 A | | 6/1998 |
| JP | 2001009800 A | | 1/2001 |
| JP | 2001048511 A | | 2/2001 |
| JP | 2001236878 A | | 8/2001 |
| JP | 2001-312953 | * | 11/2001 |
| JP | 2001312954 A | | 11/2001 |
| JP | 2002124180 A | | 4/2002 |
| JP | 200317405 A | | 1/2003 |
| JP | 2003007198 A | | 1/2003 |
| JP | 2004127713 A | | 4/2004 |
| JP | 2004214164 A | | 7/2004 |

OTHER PUBLICATIONS

Jeong et al., "Preparation of Aligned Carbon Nanotubes with Prescribed Dimensions: Template Synthesis and Sonication Cutting Approach", Chem. Mater. 2002, 14, pp. 1859-1862.*

* cited by examiner

*Primary Examiner*—Kishor Mayekar
(74) *Attorney, Agent, or Firm*—Volpe and Koenig, P.C.

(57) ABSTRACT

The present invention provides a method of manufacturing a field emitter electrode using self-assembling carbon nanotubes as well as a field emitter electrode manufactured thereby. The method comprises anodizing an aluminum substrate to form an anodized aluminum oxide film having a plurality of uniform pores on the aluminum substrate, preparing an electrolyte solution having carbon nanotubes dispersed therein, immersing the anodized aluminum substrate in the electrolyte solution and applying a given voltage to the aluminum substrate as one electrode, so as to attach the carbon nanotubes to the pores, and fixing the attached carbon nanotubes to the pores.

11 Claims, 3 Drawing Sheets

METHOD OF MANUFACTURING FIELD EMITTER ELECTRODE USING SELF-ASSEMBLING CARBON NANOTUBES AND FIELD EMITTER ELECTRODE MANUFACTURED THEREBY

BACKGROUND OF THE INVENTION

RELATED APPLICATION

The present application is based on, and claims priorities from, Korean Application Number 2004-68617, filed Aug. 30, 2004, and Korean Application Number 2004-96538, filed Nov. 23, 2004, the disclosure of which is incorporated by reference herein in its entirety.

1. Field of the Invention

The present invention relates to a method of manufacturing a field emitter electrode, and more particularly to a method of manufacturing a field emitter electrode, which increases the adhesion strength and distribution uniformity of the carbon nanotubes by using the self-assembling carbon nanotubes, as well as a field emitter electrode manufactured thereby.

2. Description of the Prior Art

Generally, a field emission display (FED) is a light source based on the emission of electrons in a vacuum, and includes a field emitter electrode in which a plurality of fine tips or emitters that emit electrons are formed. The emitted electrons are accelerated in a vacuum toward a screen of phosphor material so as to excite the fluorescent material which then emits light. Unlike a CRT display, the FED neither requires beam steering circuitry nor produces large amounts of unwanted heat. Furthermore, unlike an LCD display, the FED requires no back light, is very light and has a very wide viewing angle, and has a very short response time. Due to such advantages, the FED is, now expected to be the next-generation light source for various illumination and display application.

The performance of the FED depends mainly on an emitter electrode capable of emitting electrons. Recently, carbon nanotubes (hereinafter, also referred to as "CNTs") as emitters are used to improve field emission characteristics. In order to use CNTs as emitters in field emission devices, CNTs should be attached uniformly and securely to the field emitter electrode.

The prior methods for manufacturing the field emitter electrode using CNTs include a method comprising dispersing CNTs in a paste, printing the paste onto substrate and sintering the printed paste at high temperature. However, this method has problems in that the process is complicated and the performance of the field emitter electrode is deteriorated due to gas leakage, etc.

Another proposed method comprise dispersing CNTs in an organic solvent and pressing the dispersion onto a substrate using a ceramic filter. Further, a field emitter electrode can be made by depositing CNTs directly onto a substrate. However, the use of such methods result in low contact resistance due to the poor adhesion of CNTs, and low field emission efficiency due to the non-uniform distribution of CNTs.

U.S. Pat. No. 6,129,901 discloses a method comprising depositing a catalytic metal into the fine pores of an alumina template and then generating CNTs on the substrate by chemical vapor deposition (CVD). However, this method is not suitable for large-area applications and requires a transition metal catalyst. Also, CNTs are grown in bundles depending on the size of the catalyst, thus making it difficult to obtain the uniformly distribute the CNTs. Also, the adhesion between the catalyst and CNTs is poor, so that the CNTs are liable to become detached. In addition, this method requires vacuum equipment, which makes it unsuitable for use in mass production.

SUMMARY OF THE INVENTION

Accordingly, the present invention has been made keeping in mind the above problems occurring in the prior art, and an object of the present invention is to provide a method of manufacturing a field emitter electrode, which enables carbon nanotube emitters to be uniformly and securely adhered on a substrate.

Another object of the present invention is to provide a field emitter electrode having excellent field emission efficiency and low contact electrical resistance.

In one aspect, the present invention provides a method of manufacturing a field emitter electrode using self-assembling carbon nanotubes, the method comprising the steps of: anodizing an aluminum substrate to form an anodized aluminum oxide film having a plurality of uniform pores on the aluminum substrate; preparing an electrolyte solution having carbon nanotubes dispersed therein; immersing the anodized aluminum substrate in the electrolyte solution and applying a predetermined voltage to the aluminum substrate serving as one electrode, so as to attach the carbon nanotubes to the pores; and fixing the attached carbon nanotubes to the pores.

In the inventive method as described above, the pores are preferably 0.5-2 μm in depth and 100-400 nm in diameter. Also, the step of attaching the carbon nanotubes to the pores may be performed by electrophoresis, dielectrophoresis or AC electrolysis. Also, the anodizing of the aluminum substrate may also be performed by a two-step anodizing process consisting of a first anodizing step, the etching of the anodized aluminum film, and a second anodizing step, such that pores with a more uniform diameter distribution and arrangement are formed on the aluminum substrate.

Also, in the inventive method, the step of fixing the carbon nanotubes to the pores may be performed by a thermal treatment. Alternatively, the step of fixing the carbon nanotubes may be performed by coating a binder on the aluminum substrate.

In order to increase the outside exposed lengths of the carbon nanotubes fixed to the pores, at least a portion of the thickness of the anodized aluminum oxide film may be removed after the step of fixing the carbon nanotubes to the pores. Also, in order to make the outside exposed lengths of the carbon nanotubes fixed to the pores constant, after the step of fixing the carbon nanotubes to the pores, the anodized aluminum oxide film may also be polished and etched by at least a portion of the thickness thereof. Thus, the exposed lengths of the carbon nanotubes become constant, resulting in more uniform field emission.

In another aspect, the present invention provides a field emitter electrode comprising: an aluminum substrate on which a porous anodized aluminum oxide film having a plurality of uniform pores has been formed; and carbon nanotubes which have been attached and fixed to the pores of the porous anodized aluminum oxide film.

In the inventive field emitter electrode as described above, the pores are preferably 0.5-2 μm in depth and 100-400 nm in diameter.

According to the present invention, the aluminum substrate is anodized to form a porous anodized aluminum oxide (AAO) film on the substrate. Then, carbon nanotubes are attached and securely fixed to the pores of the anodized aluminum oxide film by a process, such as electrophoresis, dielectrophoresis or AC electrolysis. This results in a field emitter electrode in which carbon nanotube emitters are uniformly and securely fixed.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
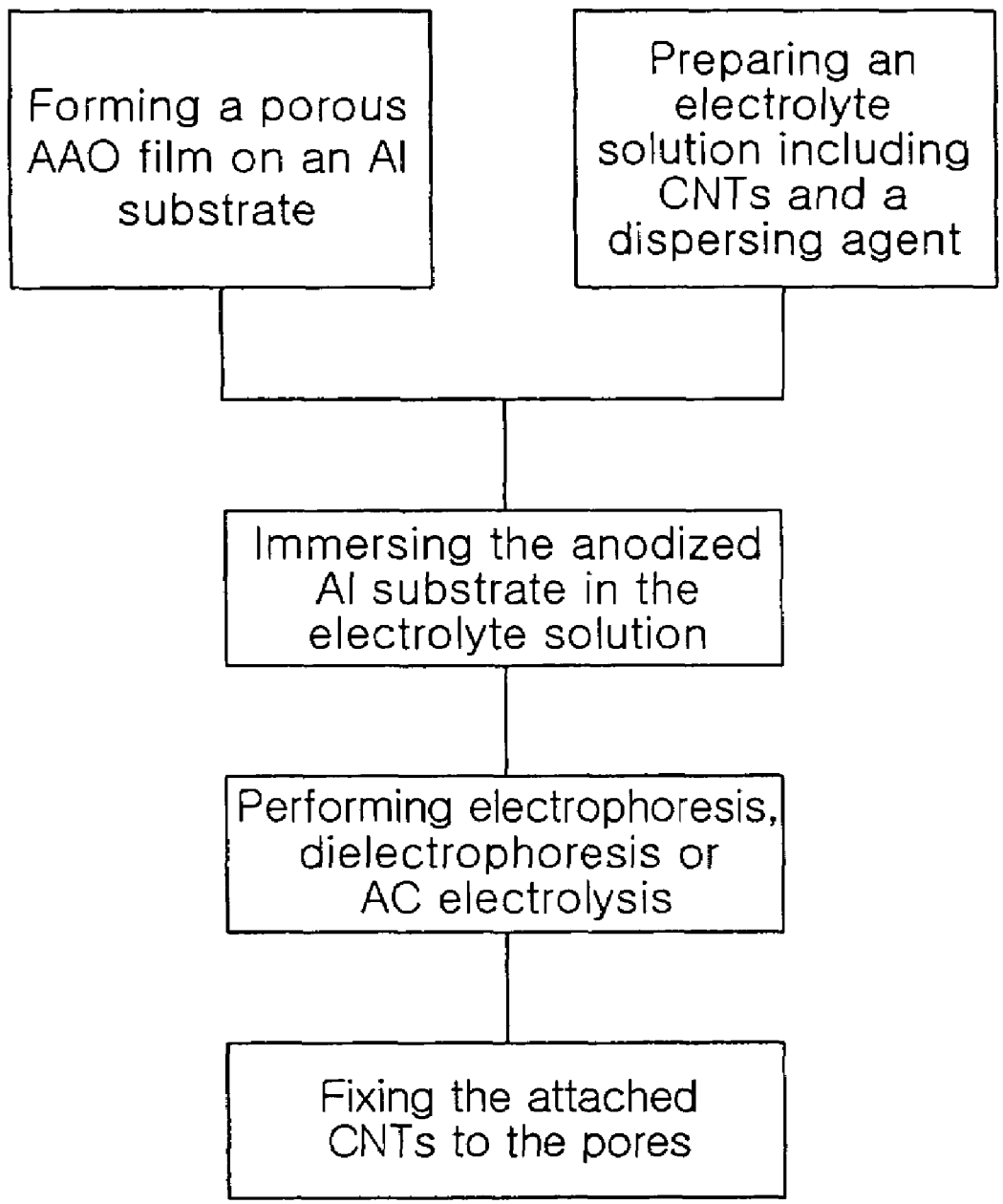
FIG. 1 is a schematic flow chart showing the inventive method of manufacturing a field emitter electrode using self-assembling carbon nanotubes.

Hereinafter, embodiments of the present invention will be described with reference to the accompanying drawings. Such embodiments may be modified and are not construed to limit the scope of the present invention. Such embodiments are given to provide a more complete description of the present invention to a person ordinarily skilled in the art. Thus, the size of elements in the drawings may be magnified to provide a clearer depiction.

FIG. 1 is a schematic flow chart showing the inventive method of manufacturing a field effect emitter electrode using the self-assembling carbon nanotubes.

As shown in FIG. 1, an aluminum substrate is first anodized to form a porous anodized AAO film having a plurality of uniform pores on the surface thereof. This AAO film is an aluminum oxide film, on the surface of which a number of upwardly open pores are formed. The aluminum substrate can be either an aluminum sheet made of pure aluminum or a substrate coated with aluminum. As used herein, the term "aluminum substrate" is intended to include both the aluminum sheet and the aluminum-coated substrate.

By an anodizing process, an AAO film having a plurality of uniform pores can be formed on the aluminum substrate. The anodizing process is generally well known in the art. More specifically, the aluminum substrate is washed and degreased by electro-polishing, and then immersed in an anodic electrolyte solution. The immersed aluminum substrate is anodized by the application of a given voltage. This results in the formation of an AAO film (also referred to as an "alumite film") having a plurality of pores on the aluminum substrate. Then, if necessary, the anodized aluminum substrate may also be etched with an aqueous phosphoric acid solution. The distance between the pores formed in the AAO film and the depth of the pores can be controlled by etching time, temperature, and voltage. The diameter of the pores formed in the AAO film can be controlled by etching time and enlarged by pore widening treatment. The pore widening treatment allows the diameter of the pores to be widened to about 400 nm.

A two-step anodizing process may also be used to form an AAO film with a more uniform diameter distribution and arrangement. In the two-step anodizing oxidation process, the aluminum substrate is immersed in an anodic electrolyte solution and subjected to a first anodizing step by the application of a given voltage. Thus, the porous AAO film is formed on the substrate surface. Then, the first anodized aluminum substrate is etched to remove the AAO film. Next, the aluminum substrate is immersed again and subjected to a second anodizing step to form a porous AAO film on the aluminum substrate. Then, if necessary, the size of the pores can be increased by the pore widening treatment. If this two-step anodizing process is used to form the AAO film, pores that are more uniform and parallel can be obtained. In this case, as the anode electrolyte solution, an oxalic acid, sulfuric acid, phosphoric acid or chromic acid solution may be used.

The depth of the pores formed in the AAO film is preferably about 0.5-2 μm. If the pore depth is less than 0.5 μm, the carbon nanotubes which are inserted and attached into the pores will easily fall down since the depth is too shallow. If the pore depth is more than 2 μm, the tips of the carbon nanotubes inserted into the pores will not be sufficiently exposed to the outside since the depth is too deep.

Also, the pores preferably have a diameter of 100-400 nm, and more preferably 200-300 nm. If the pore diameter is too large, so that the carbon nanotubes are too densely attached to the pores, emission will be reduced. Also, if the pore diameter is too small, so that the density of the tips of the carbon nanotubes attached to the pores is too low, the carbon nanotubes cannot form a surface light source. In order for the carbon nanotubes to be easily inserted into the pores, the diameter of the pores is preferably about 5-6 times greater than the diameter of the carbon nanotubes (about 20-50 nm). The porous AAO film on the aluminum substrate is partially etched to remove an oxide layer at the pore bottom, thus exposing aluminum at the pore bottom. The aluminum substrate having the pores formed thereon acts as an electrode in subsequent electrophoresis, dielectrophoresis or AC electrolysis.

Meanwhile, carbon nanotubes (CNTs) and a dispersing agent are added to deionized water so as to prepare an electrolyte solution in which the CNTs are uniformly dispersed. Examples of the CNTs include multi-wall nanotubes (MWNTs), double wall nanotubes (DWNTs), and single wall nanotubes (SWNTs). Among them, MWNTs are most suitable, due to their high conductivity. It is preferable to use arc-MWNTs which are prepared in the form of a straight line. The MWNTs preferably have a diameter of about 10-50 nm.

The content of the CNTs in the electrolyte solution is, for example, but not necessarily, 10-100 mg/L. A CNT content of less than 10 mg/L leads to a low CNT density, and a CNT content of more than 100 mg/L causes aggregation of the CNTs, thus making it difficult to disperse the CNTs uniformly.

The dispersing agent which is used in the present invention may be one selected from the group consisting of benzene konium chloride, sodium dodecyl sulfate, polyethyleneimine, and magnesium chloride. The dispersing agent is preferably added in an amount of about 100-500% by weight relative to the weight of the CNTs. If the content of the dispersing agent is less than 100% by weight, the dispersing agent will not be applied uniformly to all the CNTs, thus making the dispersion of CNTs insufficient, and if it is more than 500% by weight, an excess amount of the dispersing agent will be aggregated together, thus interfering with the adhesion of the dispersing agent to the CNTs. The CNTs and the dispersing agent may be added to the electrolyte solution in various ways. For example, the dispersing agent together with the CNTs can be added directly into the electrolyte solution, and uniformly dispersed by means of a sonicator.

After preparing the aluminum substrate having the AAO film formed thereon and the CNT-containing electrolyte solution as described above, the aluminum substrate is immersed in the electrolyte solution, and the aluminum substrate is subjected to electrophoresis, dielectrophoresis or AC electrolysis by the application of a given voltage. This result in the insertion and adhesion of the CNTs into the pores formed in the porous AAO film.

During the electrophoresis, dielectrophoresis or AC electrolysis process, voltage pulses may be used to separate CNTs weakly adhered to the substrate and to increase the number of CNTs which are inserted into the pores. It is preferable for better field emission effects to form one CNT (emitter tip) in about one of 10 pores, rather than inserting CNTs into all the pores. The density of CNTs inserted into the pores can be controlled by adjusting the content of CNTs in the electrolyte solution and/or by adjusting the electrophoresis time. The content of CNTs in the electrolyte solution may be 10-100 mg/L as illustrated above. For example, by performing electrophoresis for 1-5 minutes, the CNTs may be inserted into the pores of the substrate to a CNT density at which the optimum field emission effect is realized. An increase in electrophoresis time leads to an increase in the density of CNTs which are inserted into the pores.

Although a plurality of CNTs may be inserted into one pore, the insertion of many CNTs into one pore results in emission reduction. Thus, if necessary, about 1-3 CNTs are preferably inserted into one pore.

Figure 2:
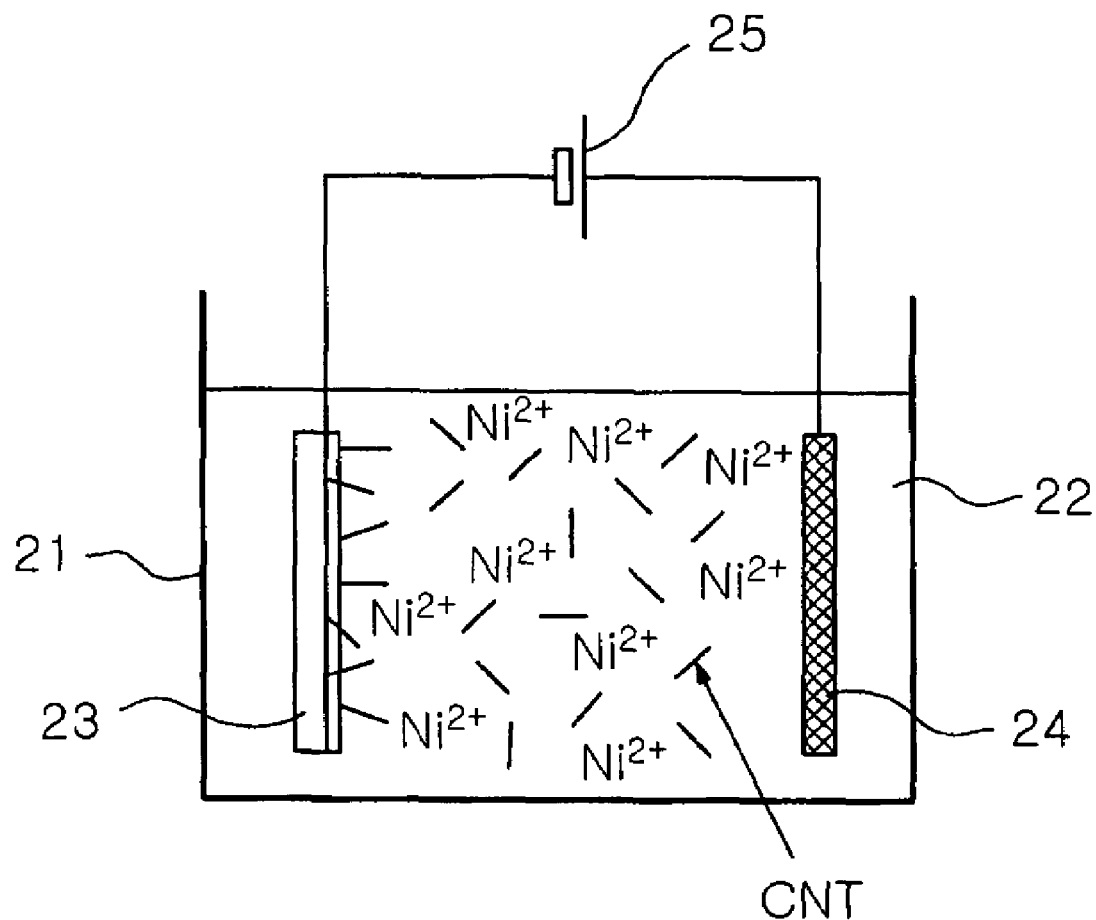
FIG. 2 schematically shows an electrophoresis system which is used in the inventive method.

FIG. 2 shows an example of an electrophoresis system which can be used in the present invention.

As shown in FIG. 2, the electrolyte solution 22 is charged into the electrolytic bath 21. The aluminum substrate having the porous AAO film formed thereon, which acts as a negative electrode 23, is immersed in the electrolyte solution 22 together with a positive electrode 24. Examples of a positive electrode which can be used in the present invention include a carbon electrode and a lead sheet. Then, a given voltage is applied across the two electrodes 23 and 24, so that the CNTs in the electrolyte solution 22 are inserted into and adhere to the pores formed on the aluminum substrate, a negative electrode. The applied voltage is preferably several tens of volts.

Figure 3A:
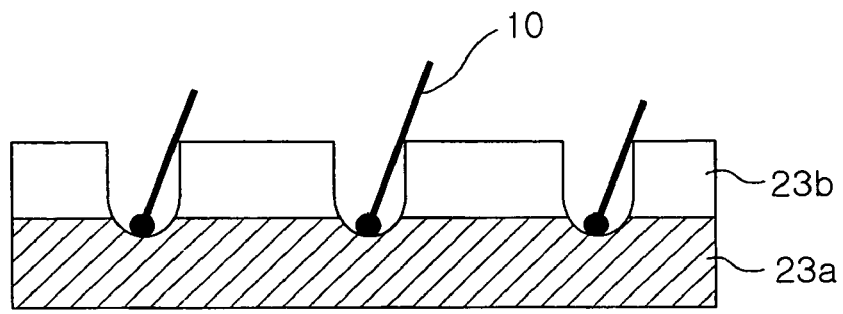
FIGS. 3a to 3d schematically show the cross-sectional views of field emitter electrodes manufactured according to several embodiments of the present invention.
Figure 3B:
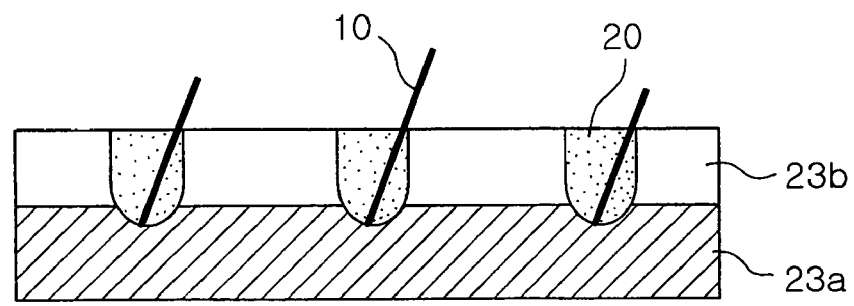

Next, the aluminum substrate to which CNTs have adhered is dried, after which the CNTs adhering to the pores of the aluminum substrate are fixed. The fixing is performed either by a thermal treatment or by coating with a binder. FIGS. 3a and 3b show states where CNTs have been fixed to the pores by the thermal treatment and the binder coating process, respectively.

FIG. 3a shows a state where CNTs have been fixed to the pores by a thermal treatment. Referring to FIG. 3a, carbon nanotubes 10 are inserted into the pores formed in the porous AAO film 23b on the aluminum substrate 23a. The carbon nanotubes 10 are welded and fixed to the pore bottom by thermal treatment. The thermal treatment for fixing the carbon nanotubes can be carried out at a temperature of 400-700° C. for about 2-3 hours under an atmosphere of inert gas, such as argon or helium. By performing the thermal treatment in the above-described temperature and time ranges, the adhesion of CNTs to the pores can be increased by a suitable diffusion mechanism without damage to the substrate. By performing this thermal treatment, the defects of CNTs are restored and CNTs are securely fixed into the pores on the aluminum substrate.

FIG. 3b is a cross-sectional view showing a state where CNTs have been fixed to the pores by the binder coating. Referring to FIG. 3b, the binder is coated on the AAO film 23b of the aluminum substrate 23a, which has the CNTs 10 adhered thereto, so that the pores of the AAO film 23b are filled with the binder 20. This results in securely fixing the CNTs 10 into the pores. The binder which can be used in the present invention is, but is not limited to, epoxy resin, etc. To further enhance the adhesion of the CNTs, after welding the CNTs by the thermal treatment as shown in FIG. 3a, the pores (pores inserted with CNTs) may also be filled with the binder by the binder coating.

Figure 3C:
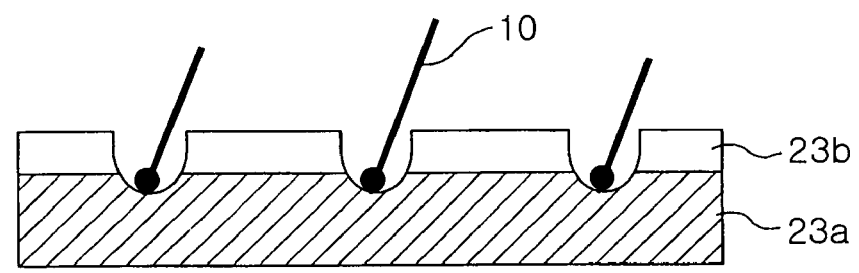

In order to increase the outside exposed length of the CNTs fixed to the pores, after fixing the CNTs to the pores by thermal treatment, the AAO film may also be etched to remove at least a portion of the thickness of the AAO film. FIG. 3c shows a state where a portion of the thickness of the AAO film 23b has been removed by etching. This results in a further increase in the outside exposed length of the CNTs 10 fixed to the pores of the AAO film 23b. In order for the CNTs fixed to the pores to be useful as emitters, the CNTs 10 must be exposed to the outside by a thickness of 0.5-1 µm such that effective field emission can be realized.

Figure 3D:
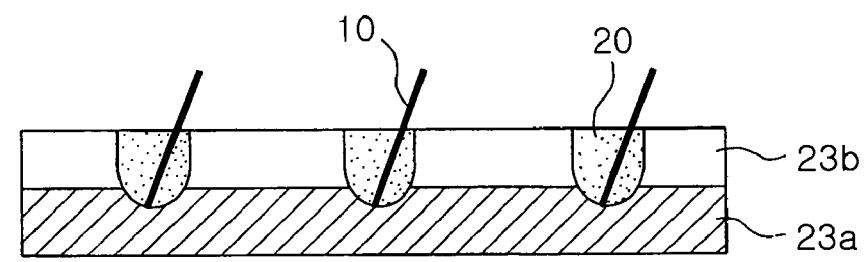

Also, in order to make the outside exposed lengths of the CNTs fixed to the pores constant, after fixing the CNTs to the pores by the binder, the CNTs and the AAO film may polished and the AAO film may be etched by at least a portion of the thickness thereof. This makes the lengths of the CNTs constant, thus increasing the uniformity of field emission. FIG. 3d shows a state where the CNTs 10 have been exposed to substantially the same length by polishing the CNTs 10 and the AAO film 23b and etching the AAO film 23b.

Specifically, as shown in FIG. 3b, the CNTs 10 adhering to the pores are fixed by the binder, and then chemical mechanical polishing is performed to cut the CNTs 10 to the same length. Then, the AAO film 23b filled with the binder is etched such that the CNTs are sufficiently exposed to the outside. As a result, as shown in FIG. 3d, the CNTs 10 are exposed from the surface of the AAO film to the outside in substantially the same length. Since the CNTs 10 have uniform distribution density and uniform exposed length on the substrate, the uniformity and efficiency of field emission will be increased.

According to the inventive method, the CNTs can be almost vertically inserted and fixed into the pores formed in the porous AAO film on the aluminum substrate. Also, the CNTs inserted into the pores have a very uniform distribution on the substrate, and can be securely fixed to the pores by thermal treatment or binder coating. Such CNTs act as emitters in a field emission device. Thus, the inventive method can realize a field emitter electrode with improvements in the distribution uniformity and adhesion strength of the CNT emitters. The field emitter electrode manufactured according to the present invention may be used in, for example, backlight sources for LCDs.

In the field emitter electrode, the CNTs are arranged and fixed at uniform intervals, so that, in field emission, the CNTs disperse electric current so as to lengthen the life span of emitters and to increase the field emission efficiency of the emitters. In addition, the CNTs show excellent adhesive strength. Also, if the CNTs are fixed with the binder, the CNTs will be buried in polymers. Thus, the contact area between the CNTs and the electrodes is large, so that the contact electric resistance therebetween is reduced, thus reducing the deterioration of the CNT emitters. Furthermore, by controlling the pore density of the aluminum substrate, the density of the emitters can be controlled, thus making spotless light emission fluorescent material possible. Moreover, the inventive method mainly uses a wet process, and thus, is low in manufacturing costs.

Hereinafter, the present invention will be described in detail by an example.

EXAMPLE

A high-purity aluminum sheet (99.98% purity and 0.5 mm thickness) was annealed at 500° C. for 3 hours under an $N_2$ atmosphere and then degreased by electrolytic polishing in a mixed solution (1:5) of perchloric acid (70 wt %) and ethanol (95 wt %). The degreased aluminum sheet was immersed in 0.3M phosphoric acid solution at 2° C. and anodized by the application of a voltage of 150V.

By the anodizing process, a porous AAO film having a plurality of uniformly dispersed pores with a depth of about 1.5±0.5 μm and an average diameter of 300 nm was formed on the aluminum sheet.

Meanwhile, an electrolyte solution was prepared by mixing 1 liter of deionized water, 100 mg of arc-MWNT and 500 mg of SDS (500 wt % relative to the content of CNTs). The mixture was uniformly dispersed by sonication for 1 hour.

The dispersed electrolyte solution was put in an electrolytic bath, and AC electrolysis was performed using a lead sheet as a positive electrode, and the aluminum sheet with the AAO film formed thereon as a negative electrode. Pulses of about 10-50V were applied so that CNTs adhered to the pores of the porous AAO film.

Then, the aluminum sheet having the CNTs adhered thereon was thermally treated at about 600° C. for about 2 hours so as to volatilize impurities within the pores while increasing the adhesion of the CNTs. The inventive method resulted in a field emitter electrode in which the CNTs were uniformly and securely fixed to the aluminum substrate. The field emitter electrode to which the CMT emitters uniformly and securely adhere shows excellent field emission effects and low contact electric resistance.

As described above, the inventive method of manufacturing the field emitter electrode allows the manufacture of a field emitter electrode in which the CNT emitters securely adhere to the substrate. The field emitter electrode manufactured by the present invention has CNT emitters which are uniformly distributed and securely adhere to the substrate. Thus, the field emitter electrodes according to the present invention show excellent field emission effects and low contact electric resistance.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of manufacturing a field emitter electrode, the method comprising the steps of:

anodizing an aluminum substrate to form an anodized aluminum oxide film having a plurality of uniform pores on the aluminum substrate;

preparing an electrolyte solution having carbon nanotubes dispersed therein;

immersing the anodized aluminum substrate in the electrolyte solution and applying a predetermined voltage to the aluminum substrate serving as one electrode, so as to attach the carbon nanotubes to the pores; and fixing the attached carbon nanotubes to the pores; polishing the carbon nanotubes and the anodized aluminum oxide film; and removing at least a portion of the thickness of the anodized aluminum oxide film so as to increase the outside exposed length of the fixed carbon nanotubes.

2. The method of claim 1, wherein the pores are 0.5-2 μm in depth and 100-400 nm in diameter.

3. The method of claim 1, wherein the step of attaching the carbon nanotubes to the pores is performed by electrophoresis, dielectrophoresis or AC electrolysis.

4. The method of claim 1, wherein the step of anodizing of the aluminum substrate is performed by a two-step anodizing process consisting of a first anodizing step, a etching step of the anodized aluminum film, and a second anodizing step.

5. The method of claim 1, wherein the carbon nanotubes are arc-multi-wall nanotubes (MWNTs).

6. The method of claim 1, wherein a dispersing agent is added to the electrolyte solution.

7. The method of claim 6, wherein the dispersing agent is one selected from the group consisting of benzene konium chloride, sodium dodecyl sulfate, polyethyleneimine, and magnesium chloride.

8. The method of claim 6, wherein the dispersing agent is added in an amount of about 100-500% by weight relative to the weight of the carbon nanotubes.

9. The method of claim 1, wherein the step of fixing the carbon nanotubes to the pores is performed by a thermal treatment.

10. The method of claim 9, wherein the thermal treatment is carried out at a temperature of 400-700° C. under an inert atmosphere.

11. The method of claim 1, wherein the step of fixing the carbon nanotubes is performed by coating a binder on the aluminum substrate.

* * * * *